United States Patent [19]

Saffron

[11] Patent Number: 4,747,521
[45] Date of Patent: May 31, 1988

[54] DOSAGE DEVICE

[75] Inventor: Ronald G. Saffron, Salisbury, England

[73] Assignee: Merck & Co., Inc., Rahway, N.J.

[21] Appl. No.: 928,359

[22] Filed: Nov. 10, 1986

[51] Int. Cl.⁴ .............................................. B67D 5/06
[52] U.S. Cl. .................................... 222/205; 222/207; 222/430
[58] Field of Search ............... 222/206, 207, 205, 211, 222/109, 110, 111, 430, 426, 42

[56] References Cited

U.S. PATENT DOCUMENTS

| 1,859,833 | 5/1932 | Mauley | 222/42 X |
| 3,089,623 | 5/1963 | Padzieski | 222/207 |
| 4,146,154 | 3/1979 | Mastman | 222/205 |

Primary Examiner—Joseph J. Rolla
Assistant Examiner—Kenneth Noland
Attorney, Agent, or Firm—David L. Rose; Michael C. Sudol

[57] ABSTRACT

A dosage device for the delivery of a measured quantity of a liquid or flowable paste, such as a medicament, comprises a cup component and a compartmented component which is secured within the cup component and rotatable with respect thereto about an axis, the cup component having a radial base wall with an opening radially offset from the axis, the compartmented component having axially extending walls bounding a plurality of compartments each of which has an open end and each of which can be brought, by relative rotation of the two components, into alignment with the base wall opening, each compartment having in its outer wall an outlet which is at a respective different axial spacing from its open end, the cup component and that outer wall bounding a dispensing space to receive liquid or flowable paste from the compartment.

8 Claims, 4 Drawing Sheets

DOSAGE DEVICE

This invention relates to a device for the delivery of any selected one of a plurality of different quantities of liquid or flowable paste, e.g. a medicament.

The object of the invention is to provide a dosage device, for manual operation, wherein the quantity to be delivered can be determined in a novel manner by simple manual rotation of a component, e.g. a cap, with respect to a delivery cup, to a selected one of a predetermined number of rotary positions.

According to the present invention a dosage device for the delivery of a measured quantity of a liquid or flowable paste comprises a cup component and a compartmented component, said cup component and said compartmented component each including respective means coacting to secure said compartmented component assembled within said cup component but relatively rotatable with respect thereto about an axis, said cup component including a radially extending base wall having an opening which is radially offset from said axis, said compartmented component including axially extending wall means bounding a plurality of compartments each having an open end and each of which can be brought selectively, by relative rotation of the two components, into a position of alignment of its open end with said base wall opening, an outer wall portion bounding each compartment including an outlet disposed at a respective different axial spacing from said open end, said cup component and said outer wall portion bounding a dispensing space.

With such a dosage device, when fitted onto a means for dispensing liquid, e.g. a squeeze bottle, liquid or paste is firstly forced through the offset opening of the base of the cup so as to pass into and through a selected aligned compartment and into the dispensing space. Then suction is applied to the supply, e.g. by releasing the squeeze bottle, to cause the liquid or paste to be sucked back into the supply. Assuming that the dosage device is kept with its axis substantially vertical, the liquid or paste will flow back out of the dispensing space down to the level of the outlet of the compartment selected, so as to leave the respective measured quantity in the dispensing space. Thereafter, the device can be tilted to dispense that quantity out of the dispensing space.

In a preferred form of construction, the cup component includes a side wall which bounds the dispensing space, and the compartmented component includes a top wall abutting the side wall and forming a cap having a pouring opening. The coacting securing means may comprise respective tenon and recess formations on said side wall and top wall, e.g. to provide a resilient "snap-fit".

To facilitate use of the dosage device with a dip tube, the base wall may have a depending tubular flange, corresponding to its opening, to receive the dip tube, e.g. as a push-fit therein.

To facilitate use of the dosage device with a squeeze bottle having a neck with external threading, the device may have a depending neck, e.g. on the base wall, with internal threading to engage with the threading of the bottle.

In a first embodiment, the axially extending wall means of the compartmented component are constituted by a tube traversed by radial walls, and to enhance sealing and location of the end of said tube with respect to the base wall, the base wall may carry an upstanding ring flange with which the end of the tube is slidably engaged.

In another embodiment, the axially extending wall means of the compartmented component are constituted by two tubes disposed at a spacing one within the other and with radial walls traversing the space between them.

In order that the nature of the invention may be readily ascertained, two embodiments of dosage device in accordance therewith are hereinafter particularly described with reference to the figures of the accompanying drawings, wherein.

Figure 1:
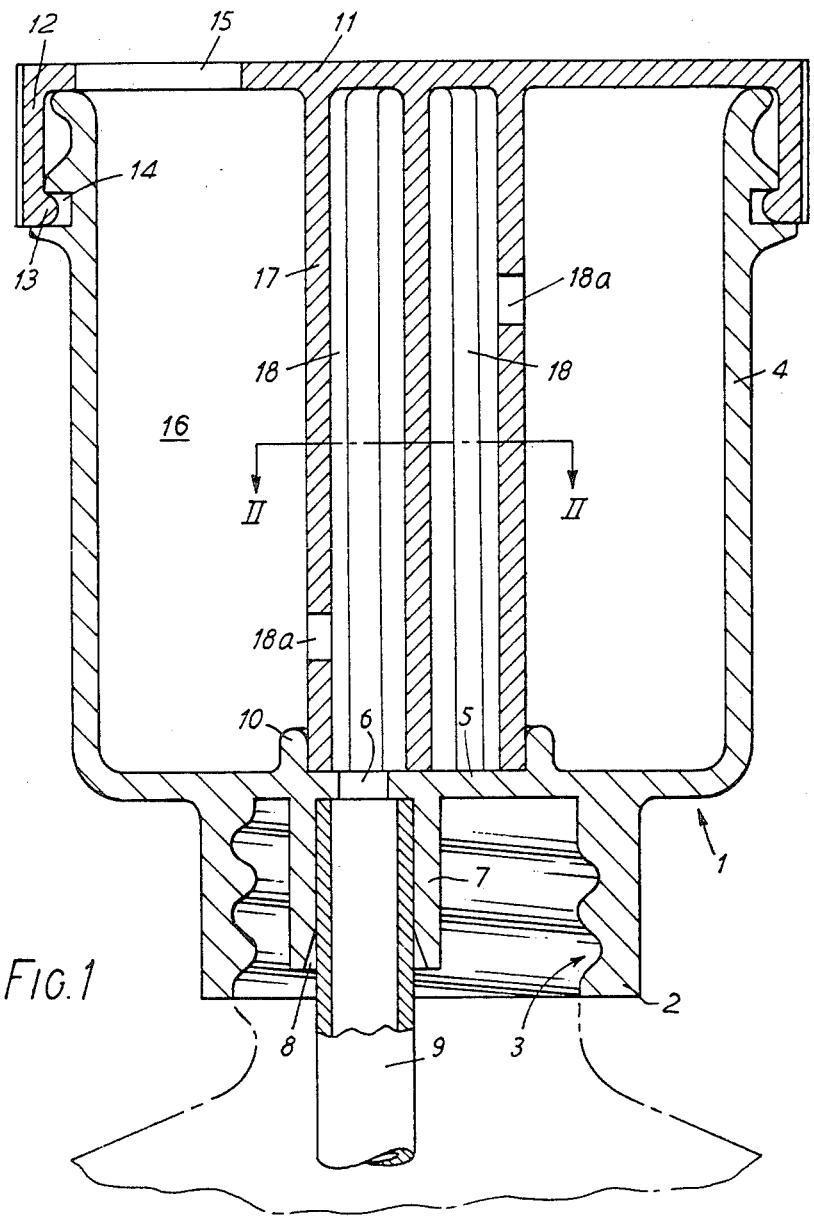
FIG. 1 is an axial section of a first embodiment.
Figure 2:
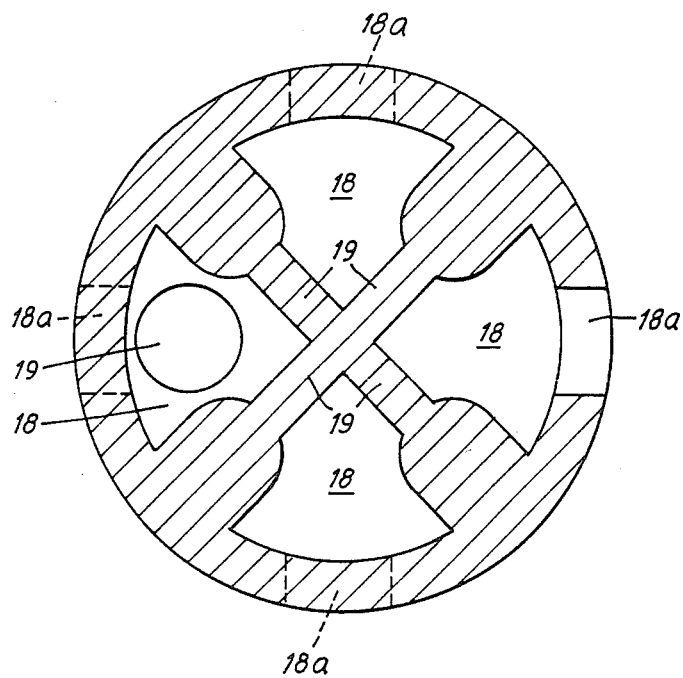
FIG. 2 is a radial section, to a larger scale, taken on the line II—II of FIG. 1.

Referring to figs.1 and 2, the dosage device is intended for attaching to a source of supply of a flowable substance such as a medicament. The dosage device, denoted as a whole by reference numeral 1, has a neck 2 with an internal thread 3 which can engage onto a corresponding male thread of a neck of a squeeze bottle.

The dosage device 1 comprises two components which are relatively rotatable but which are captive one within the other. A first component 4 is in the form of a cup with a base wall 5 carrying the neck 2. The base wall 5 has an opening 6, and concentric with the opening there is a flange 7 which is chamfered at 8 and which is adapted to receive the upper end of a dip tube 9 as a tight push fit. Within the cup 4, the base wall 5 has an upstanding ring flange 10 which is concentric with the cup. The other component 11 includes a cap portion which has a depending side wall 12 with a tenon or bead 13 to engage into a recess 14 about the periphery of the upper end of the side wall of the cup 4 so as to retain the cap as a snap fit on the cup 4.

The top wall of the cap is apertured at 15 to provide a pouring opening from the space 16. The component 11 has a central cylindrical wall 17 the internal volume of which is divided into four compartments 18 by transverse radial walls 19 arranged at 90° to each other, as seen in FIG. 2. Each compartment 18 communicates with the dispensing space 16 through a respective opening 18a which is arranged at a different height along the axis of the central wall 17.

The component 11 can be rotated manually with respect to the cup 4 so as to bring any selected one of the compartments 18 into correspondence with the opening 6.

In use, the dosage device is screwed firmly onto the neck of a bottle containing the liquid or paste to be dispensed. The bottle is, for example, a squeeze bottle, so that by applying suitable pressure by hand to the bottle, the liquid can be forced up through the dip tube 9 and through the opening 6 into whichever of the compartments 18 happens to be aligned with the opening 6. The liquid will then flow through the respective opening 18a into the dispensing space 16. When the hand pressure is released on the squeeze bottle, the liquid is sucked back down again from the compartment 18, and from the space 16, until the level of the liquid in the space 16 has fall just to the level of the lower lip of the opening 18a.

The liquid remaining thereafter in the dispensing space 16 constitutes a measured dosage which can be dispensed by tilting the device to pour the liquid out through the aperture 15. As the openings 18a are disposed at different heights for each of the compartments 18, the liquid resting in the space 16, after the sucking back operation has been carried out, will be greater or lesser in quantity accordingly.

Figure 3:
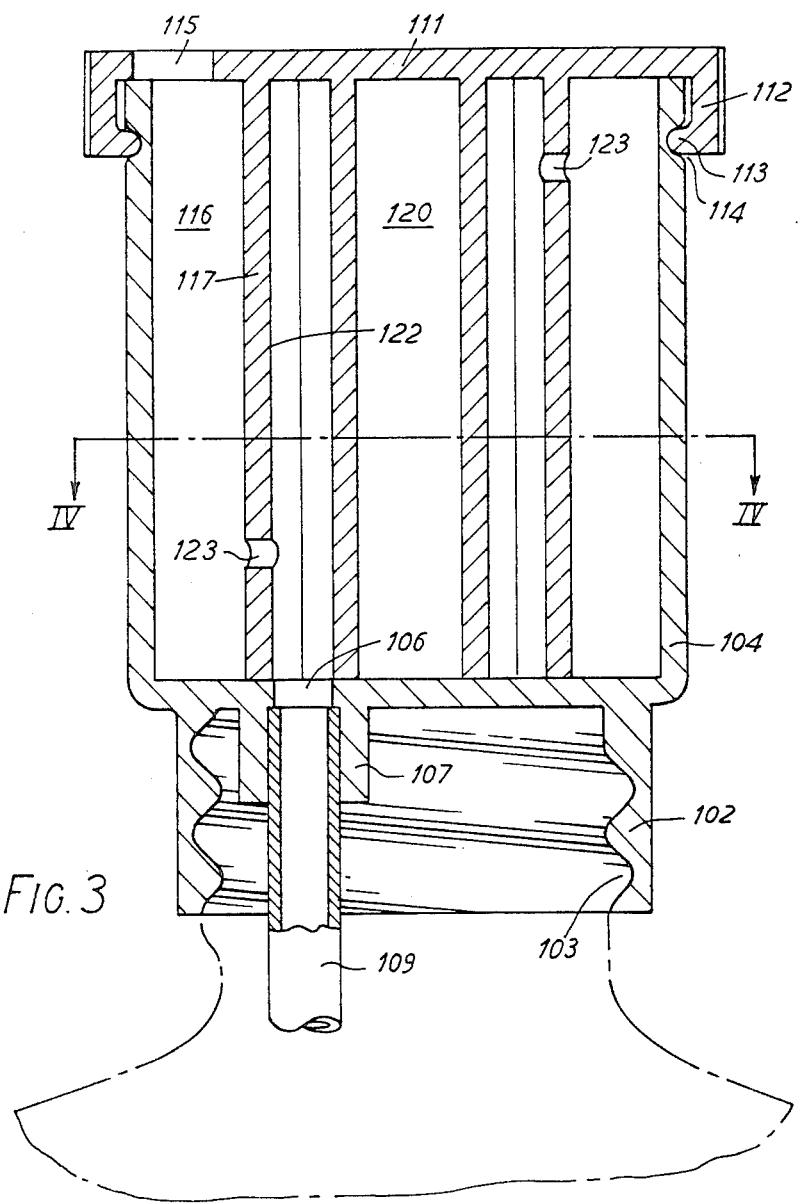
FIG. 3 is an axial section of a second embodiment.
Figure 4:
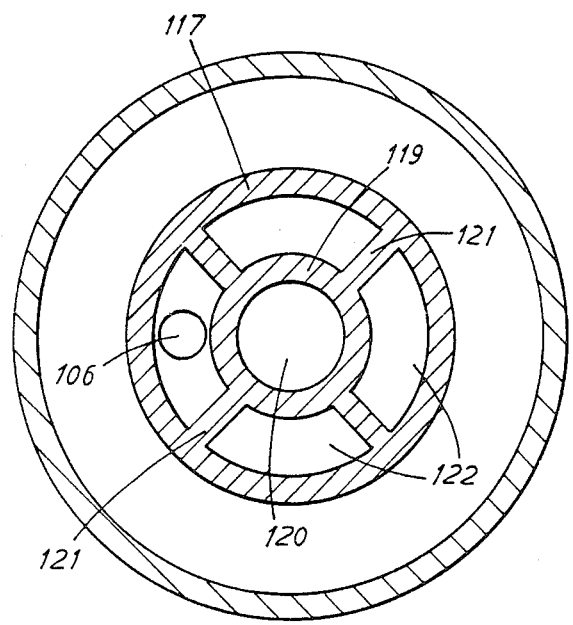
FIG. 4 is a radial section taken on the line IV—IV of FIG. 3.

Referring now to FIGS. 3 and 4, the construction and operation of the dosage device are similar to what has been described above for the construction of FIGS. 1 and 2. The structural difference is that there is provided a tubular wall 117, corresponding to the wall 17 of FIGS. 1 and 2, and a second concentric inner tubular wall 119 arranged within the wall 117.

The inner wall 119 is joined to the wall 117 by four radial walls 121 which serve to divide the interior space, defined between the two walls 117–119, into four compartments 122. The internal space 120 does not serve to receive any liquid. Each compartment 122 communicates through a respective aperture 123, arranged at different heights, with the space 116. The selection of a dosage quantity and the operation of the device with a squeeze bottle, are otherwise the same as with the construction of FIGS. 1 and 2.

In each of the constructions described, the cap may advantageously carry an index, and the cup may have circumferentially spaced "quantity marks", or vice versa, to permit the user to select a quantity to dispense.

To facilitate correct rotational setting of the cap, the cup and the cap may have coacting tenon and recess means, such as dimples, which will click into precise settings as the cap is rotated. Further, stop means may be provided to act between the cap and the cup to provide end stops of limit of rotation of the one with respect to the other.

I claim:

1. A dosage device on a squeeze bottle with a dip tube, for the delivery of a measured quantity of a liquid or flowable paste when said squeeze bottle is deformed to compress said liquid or flowable paste and force it up the dip tube, comprising a cup component and a compartmented component, said cup component and said compartmented component each including respective means coacting to secure said compartmented component assembled within said cup component but relatively rotatable with respect thereto about an axis, said cup component including a radially extending base wall having an opening which is radially offset from said axis and in communication with said dip tube, said compartmented component including axially extending wall means bounding a plurality of compartments each having an open end and each of which can be brought selectively, by relative rotation of the two components, into a position of alignment of its open end with said base wall opening, an outer wall portion bounding each compartment including an outlet disposed at a respective different axial spacing from said open end, said cup component and said outer wall portion bounding a dispensing space and said liquid or flowable paste enters the selected compartment from said dip tube and base wall opening, and enters the dispensing space through the outlet and any liquid or flowable paste in the dispensing space above the level of the outlet of the selected compartment is returned to the squeeze bottle through said outlet when the compression of the liquid or flowable paste is released.

2. A dosage device, as claimed in claim 1, wherein said cup component includes a side wall which bounds said dispensing space, and wherein said compartmented component includes a top wall abutting said side wall and forming a cap having a pouring opening.

3. A dosage device, as claimed in claim 2, wherein said coacting securing means comprise respective tenon and recess formations on said side wall and top wall.

4. A dosage device, as claimed in any one of claims 1 to 3, comprising a depending tubular flange on said base wall to receive a dip tube.

5. A dosage device, as claimed in any one of claims 1 to 3, comprising a depending neck having internal threading for engagement on the external threading of a squeeze bottle.

6. A dosage device, as claimed in any one of claims 1 to 3, wherein said axially extending wall means of said compartmented component are constituted by a tube traversed by radial walls.

7. A dosage device, as claimed in claim 6, wherein said radially extending base wall carries an upstanding ring flange with which an end of said tube is slidably engaged.

8. A dosage device, as claimed in any one of claims 1 to 3, wherein said axially extending wall means of said compartmented component are constituted by two tubes disposed at a spacing one within the other with radial walls traversing the space between them.

* * * * *